(12) United States Patent
Liberty et al.

(10) Patent No.: US 10,223,718 B2
(45) Date of Patent: Mar. 5, 2019

(54) SYSTEM AND METHOD FOR ADAPTIVE MOBILE APPLICATION

(71) Applicant: Mozido, Inc., Austin, TX (US)

(72) Inventors: Michael A. Liberty, Windermere, FL (US); Mike Love, Austin, TX (US); Steve Bacastow, Cumming, GA (US); Teri Harwood, Austin, TX (US); Aliaksandr Manusovich, Austin, TX (US)

(73) Assignee: Mozido, Inc., Austin, TX (US)

( * ) Notice: Subject to any disclaimer, the term of this patent is extended or adjusted under 35 U.S.C. 154(b) by 782 days.

(21) Appl. No.: 14/601,006

(22) Filed: Jan. 20, 2015

(65) Prior Publication Data

US 2015/0206210 A1    Jul. 23, 2015

Related U.S. Application Data

(60) Provisional application No. 61/930,227, filed on Jan. 22, 2014.

(51) Int. Cl.
| | |
|---|---|
| *H04M 3/42* | (2006.01) |
| *G06Q 30/06* | (2012.01) |
| *G06Q 30/02* | (2012.01) |
| *H04W 4/04* | (2009.01) |
| *H04W 4/18* | (2009.01) |

(52) U.S. Cl.
CPC ..... *G06Q 30/0601* (2013.01); *G06Q 30/0226* (2013.01); *H04W 4/04* (2013.01); *H04W 4/18* (2013.01)

(58) Field of Classification Search
CPC .. H04L 29/08108; H04W 64/00; H04W 4/02; H04W 48/04; G06F 3/0482; G06F 9/4443; G06F 8/34; G06Q 30/02; G06Q 30/0251; G06Q 30/0252; G06Q 30/0261
USPC ..... 455/414.1, 456.1–456.6, 457; 705/14.49, 705/14.5, 14.57, 14.58; 715/763, 765, 715/810
See application file for complete search history.

(56) References Cited

U.S. PATENT DOCUMENTS

| | | | |
|---|---|---|---|
| 2011/0191196 A1 | 8/2011 | Orr et al. | |
| 2013/0030915 A1* | 1/2013 | Statler | G06Q 30/06 705/14.54 |
| 2013/0091058 A1 | 4/2013 | Huster | |
| 2013/0238455 A1* | 9/2013 | Laracey | G06Q 20/108 705/21 |
| 2013/0246147 A1 | 9/2013 | Chen et al. | |
| 2013/0346201 A1 | 12/2013 | Bilange | |
| 2014/0025520 A1* | 1/2014 | Mardikar | G06Q 20/40145 705/21 |
| 2014/0089078 A1* | 3/2014 | Dessert | G06Q 30/0238 705/14.38 |
| 2014/0379467 A1* | 12/2014 | Huang | G06Q 30/0281 705/14.53 |

(Continued)

OTHER PUBLICATIONS

International Search Report and Written Opinion for PCT/US2015/012168 dated May 4, 2015.

*Primary Examiner* — Anthony S Addy
*Assistant Examiner* — Matthew W Genack
(74) *Attorney, Agent, or Firm* — Workman Nydegger

(57) ABSTRACT

A system and method for adapting the look, feel, and behavior of a mobile application based on the user, location or environment in which it is used.

19 Claims, 14 Drawing Sheets

(56) References Cited

U.S. PATENT DOCUMENTS

2015/0095161 A1\* 4/2015 Goel .................. G06Q 30/0267
                                                                                    705/14.64

\* cited by examiner

SYSTEM AND METHOD FOR ADAPTIVE MOBILE APPLICATION

RELATED APPLICATIONS

This application claims priority to and the benefit of U.S. Provisional Patent Application 61/930,227, entitled "System and Method for Adaptive Mobile Application", filed on Jan. 22, 2014, which application is incorporated by reference herein in its entirety.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

There has been a significant increase in the use of smart phones among people from all socio demographic backgrounds, ages, professions, and educational levels. At the same time, the number us smart phone applications available either for free or purchase is increasing exponentially. While smart phones have a very high capacity to store new applications, smart phones have a limited amount of space to reasonably display and conveniently launch applications. As the number of installed applications on a given consumer's device increases, the consumer may become reluctant to download and install new applications particularly if the consumer has another similar (incumbent) application. As a result, the smart phone default screen has become a coveted destination for businesses and application developers alike.

For example, a consumer may have installed a payment or mobile wallet application on their smart phone that is designed specifically to work with a single merchant or franchise such as a restaurant, a clothing shop or a sporting goods store. As shown in FIG. 1 (prior art), a smartphone may be configured to store a maximum number of twenty-four applications on the default screen. As shown, eight of twenty-four (or ⅓ of the applications) are dedicated to specific merchants including Merchant A, Merchant B, Merchant C, Merchant D, Merchant E, Merchant F, Merchant G, Merchant H. This leaves only sixteen available spots on the main launch screen of the phone for other applications. Many users limit the number of merchant-specific applications that they have on their phone.

BRIEF SUMMARY

Embodiments described herein provide methods and systems that allow smart phone applications to adapt in look, feel, functionality and behavior based on the user, location and other factors as described herein. Embodiments allow a single application to be installed on a smart phone and adapt its behavior and use case based on a variety of trigger factors such as location and user attributes.

In one embodiment, a method is provided for providing merchant-specific functionality for a plurality of different merchants. In one embodiment, a computer system accesses location indicators received in a data structure from a mobile device, where the data structure is received by a transceiver. The computer system also determines a current location of the mobile device based on the accessed location indicators in the received data structure. The computer system further determines, based on the determined current location of the mobile device, that the mobile device is within a specified region in relation to a merchant location. The computer system then determines that merchant-specific application settings are to be applied to an adaptive application on the mobile device, where the merchant has specified merchant-specific application settings that are to be applied to the adaptive application when the mobile device is within the specified region in relation to the merchant location. The computer system then provides an indication of which merchant-specific application settings are to be applied to the adaptive application on the mobile device, such that the determined merchant-specific application settings are dynamically applied to the adaptive application on the mobile device. As the embodiments described herein allow a single adaptive application to be used with many different merchants, users may remove many of the merchant-specific applications off of their phones, freeing up valuable home screen real estate, which allows for much more efficient user interactions with the mobile device.

In another embodiment, a computer system is provided that includes at least one processor, a transceiver, a data accessing module configured to access location indicators received by the transceiver, where the location indicators are transmitted in a data structure from a mobile device. The computer system further includes a determining module that performs the following: determines, based on the accessed location indicators in the received data structure, a current location of the mobile device, determines, based on the determined current location of the mobile device, that the mobile device is within a specified region in relation to a merchant location, and determines that merchant-specific application settings are to be applied to an adaptive application on the mobile device, where the merchant has specified merchant-specific application settings that are to be applied to the adaptive application when the mobile device is within the specified region in relation to the merchant location. The computer system further includes an applying module that dynamically applies the determined merchant-specific application settings to the adaptive application on the mobile device.

In another embodiment, a computer system is provided that includes at least one processor, a transceiver, a data accessing module configured to access trigger indicators received by the transceiver, where the trigger indicators are transmitted in a data structure from a mobile device. The computer system further includes a determining module that performs the following: determines, based on the accessed trigger indicators in the received data structure, a current configuration of the mobile device, determines, based on the determined current configuration of the mobile device the merchant-specific application settings to be applied to an adaptive application on the mobile device, where the merchant has specified merchant-specific application settings that are to be applied to the adaptive application when the mobile device is configured in accordance with the trigger. Triggers may include one or more of a location derived from a geofence, a data signal received from a beacon, an audio signal received, or scanned image. The computer system further includes an applying module that dynamically applies the determined merchant-specific application settings to the adaptive application on the mobile device.

In yet another embodiment, a computer program product is provided which comprises one or more computer storage media having thereon computer-executable instructions that, when executed by one or more processors of a computing system, cause the computing system to instantiate a user interface on a mobile device, where the user interface comprises the following: a dynamically changeable user interface (e.g. skin) that is updatable to include merchant-specific elements associated with a merchant, where the dynamically changeable skin changes based on the location of the mobile device, one or more dynamically changeable user interaction elements that allow the user to interact with the adaptive application represented by the user interface, where the dynamically changeable user interaction elements change based on the location of the mobile device, and an application data portion that presents application data.

In yet another embodiment, a computer program product is provided which comprises one or more computer storage media having thereon computer-executable instructions that, when executed by one or more processors of a computing system, cause the computing system to instantiate a user interface on a mobile device, where the user interface comprises the following: a dynamically changeable user interface (e.g. skin) that is updatable to include merchant-specific elements associated with a merchant, where the dynamically changeable skin changes based on trigger signals received by the mobile device where the dynamically changeable user interaction elements change based on the triggers or combinations of triggers received by the mobile device. Triggers may include one or more of a location derived from a geofence, a data signal received from a beacon, an audio signal received, a scanned image or user input. User input may include a biometric factor of the registered user or users wherein a biometric factor of a first user may cause the device to be configured in accordance with the first user's configuration settings and a biometric factor of a second user may cause the device to be configured in accordance with the second user's configuration settings.

Embodiments described herein can thus provide an adaptive application that can adapt itself to multiple environments while only using a single launch icon on a smart phone (default or other) screen.

DETAILED DESCRIPTION OF THE INVENTION

Figure 1:
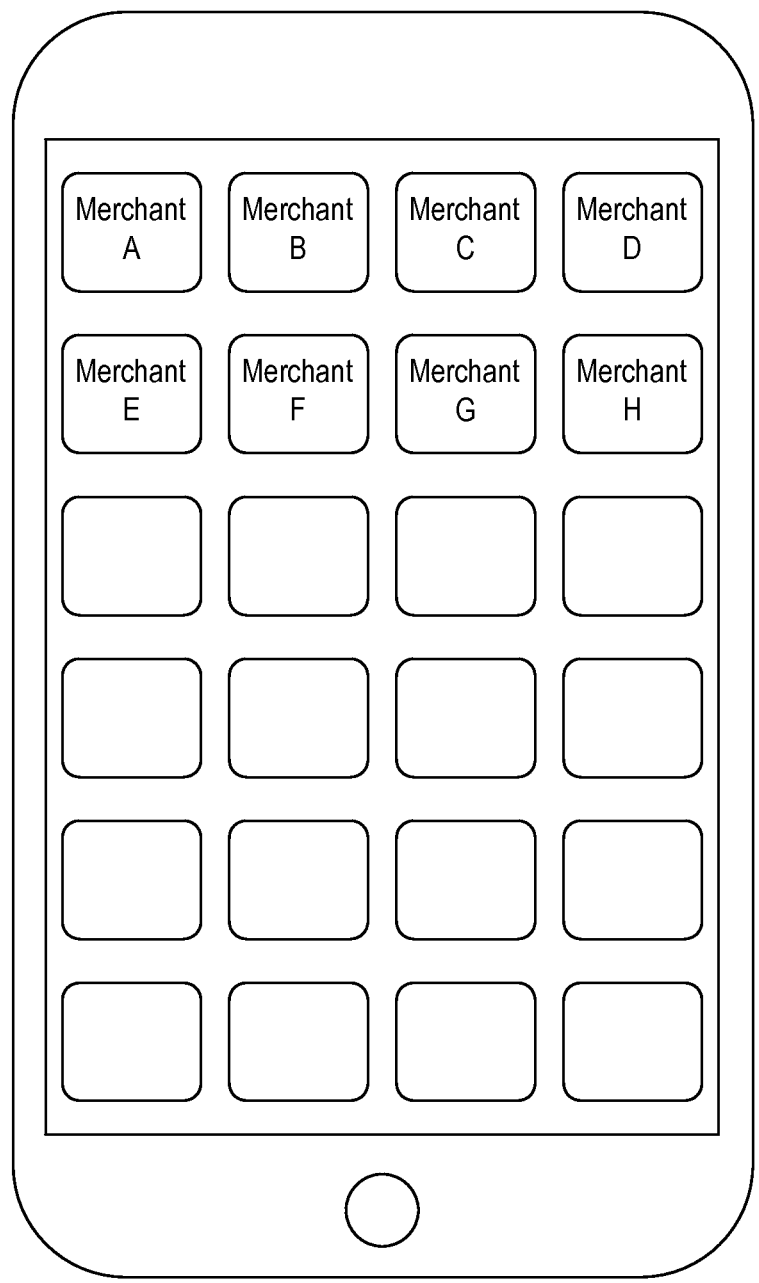
FIG. 1 (PRIOR ART) illustrates the limitations of the current art whereby a given smart phone can have multiple merchant applications.

Embodiments described herein provide methods and systems that allow smart phone applications to adapt in look, feel, functionality and behavior based on the user, location and other factors as described herein. Embodiments allow a single application to be installed on a smart phone and adapt its behavior and use case based on a variety of factors such as location and user attributes.

In one embodiment, a method is provided for providing merchant-specific functionality for a plurality of different merchants. In one embodiment, a computer system accesses location indicators received in a data structure from a mobile device, where the data structure is received by a transceiver. The computer system also determines a current location of the mobile device based on the accessed location indicators in the received data structure. The computer system further determines, based on the determined current location of the mobile device, that the mobile device is within a specified region in relation to a merchant location. The computer system then determines that merchant-specific application settings are to be applied to an adaptive application on the mobile device, where the merchant has specified merchant-specific application settings that are to be applied to the adaptive application when the mobile device is within the specified region in relation to the merchant location. The computer system then provides an indication of which merchant-specific application settings are to be applied to the adaptive application on the mobile device, such that the determined merchant-specific application settings are dynamically applied to the adaptive application on the mobile device. As the embodiments described herein allow a single adaptive application to be used with many different merchants, users may remove many of the merchant-specific applications off of their phones, freeing up valuable home screen real estate, which allows for much more efficient user interactions with the mobile device.

In another embodiment, a computer system is provided that includes at least one processor, a transceiver, a data accessing module configured to access location indicators received by the transceiver, where the location indicators are transmitted in a data structure from a mobile device. The computer system further includes a determining module that performs the following: determines, based on the accessed location indicators in the received data structure, a current location of the mobile device, determines, based on the determined current location of the mobile device, that the mobile device is within a specified region in relation to a merchant location, and determines that merchant-specific application settings are to be applied to an adaptive application on the mobile device, where the merchant has specified merchant-specific application settings that are to be applied to the adaptive application when the mobile device is within the specified region in relation to the merchant location. The computer system further includes an applying module that dynamically applies the determined merchant-specific application settings to the adaptive application on the mobile device.

In yet another embodiment, a computer program product is provided which comprises one or more computer storage media having thereon computer-executable instructions that, when executed by one or more processors of a computing system, cause the computing system to instantiate a user interface on a mobile device, where the user interface comprises the following: a dynamically changeable skin that is updatable to include merchant-specific elements associated with a merchant, where the dynamically changeable skin changes based on the location of the mobile device, one or more dynamically changeable user interaction elements that allow the user to interact with the adaptive application represented by the user interface, where the dynamically changeable user interaction elements change based on the location of the mobile device, and an application data portion that presents application data.

The following discussion refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contributes to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 2:
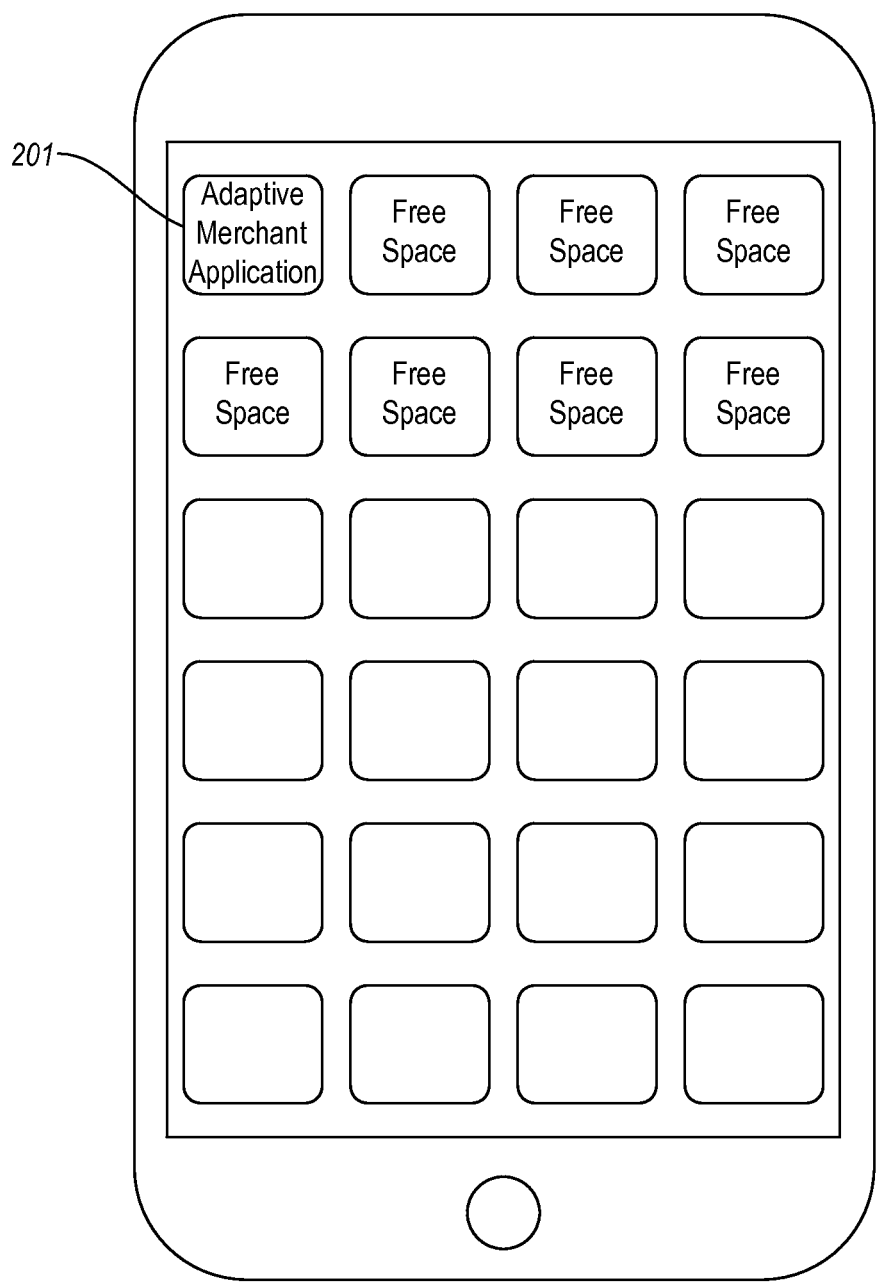
FIG. 2 illustrates an example proposed whereby a single adaptive merchant application is installed, thus freeing up space to launch other non-merchant applications.

As shown in FIG. 2, a single adaptive merchant application 201 is installed on a mobile device (e.g. a phone). When compared to FIG. 1, an additional seven spots are freed up for other applications on the main launch screen. The single adaptive merchant application may be configured to work with different merchants, and take on a new look and feel for each merchant. Moreover, different application functionality may be provided for each merchant. In one embodiment, the adaptive merchant application can be designed to change its background color and functions based on the location, time of day, various triggers and/or user preferences. Triggers may include one or more of the following: a location derived from a geofence, a data signal received from a beacon, an audio signal received, a scanned image or user input. Combinations of triggers can be used to determine specific configuration changes.

In one example, a music player application may adapt itself, when used by a child of a certain age, to consider the optimal ergonomic presentation for a child. When used by an adult, the music player application again adapts to suit the adult's ergonomic preferences. A biometric factor of the user may be used as a trigger to cause the application to adapt in accordance with configured settings. General biometric factors may be used to determine, for example, the age of the user. These general factors can be voice print, facial scan or other factors which are indicative of age. Other specific biometric factors may be pre-registered and associated with a registered user of the application. Such biometric factors may include a user's fingerprint, a facial scan, a voice print or other specific biometric factors of the registered user.

Furthermore, considering a music player application, based on the age of the user and potentially other demographic user information, the music player application may determine what type of music to play, or may offer different music for sale or for download, or may restrict certain songs (e.g. explicit songs) for minors. Additionally or alternatively, the same music player application can adapt itself based on its location in such a way as to prioritize dance songs on a running route, or spiritual songs during typical church hours (or when near or inside a church), or kids songs if traveling to a specific location (e.g. Grandma's house). As will be evident to one skilled in the art, these are merely a few examples of one application (a music player). The adaptive merchant application may be any of a wide variety of applications, or may include functionality of different (known) applications. As such, the above example is not intended to be limiting.

Using these same ideas, a group of merchants located in a consolidated area such as a shopping mall can agree to subscribe to a common mobile loyalty application. Similarly, individual merchants or franchise owners may also agree to subscribe to a common mobile loyalty application. When used at Merchant A's location, the color and branding of the mobile application may change to adapt to the preferences of Merchant A, and coupons and offers within the application may be specifically targeted for Merchant A. Then, when the same adaptive merchant application is used at Merchant B's location, the color, branding, coupons, offers, etc. would correspond to Merchant B. When used at Merchant A's location, the consumer's default payment preferences can be used for Merchant A. Then, when the same application is used at Merchant B's location, the user's payment preferences for Merchant B would be used. For example, if Merchant A is for example Macy's department store, a consumer might configure their mobile payment application to always use their registered Macy's store credit card as the default payment card. If Merchant B is Ruth's Chris Steak House, the consumer may prefer to use their registered American Express credit card. Again, these are merely a small number of examples among many possible examples.

Figure 3:
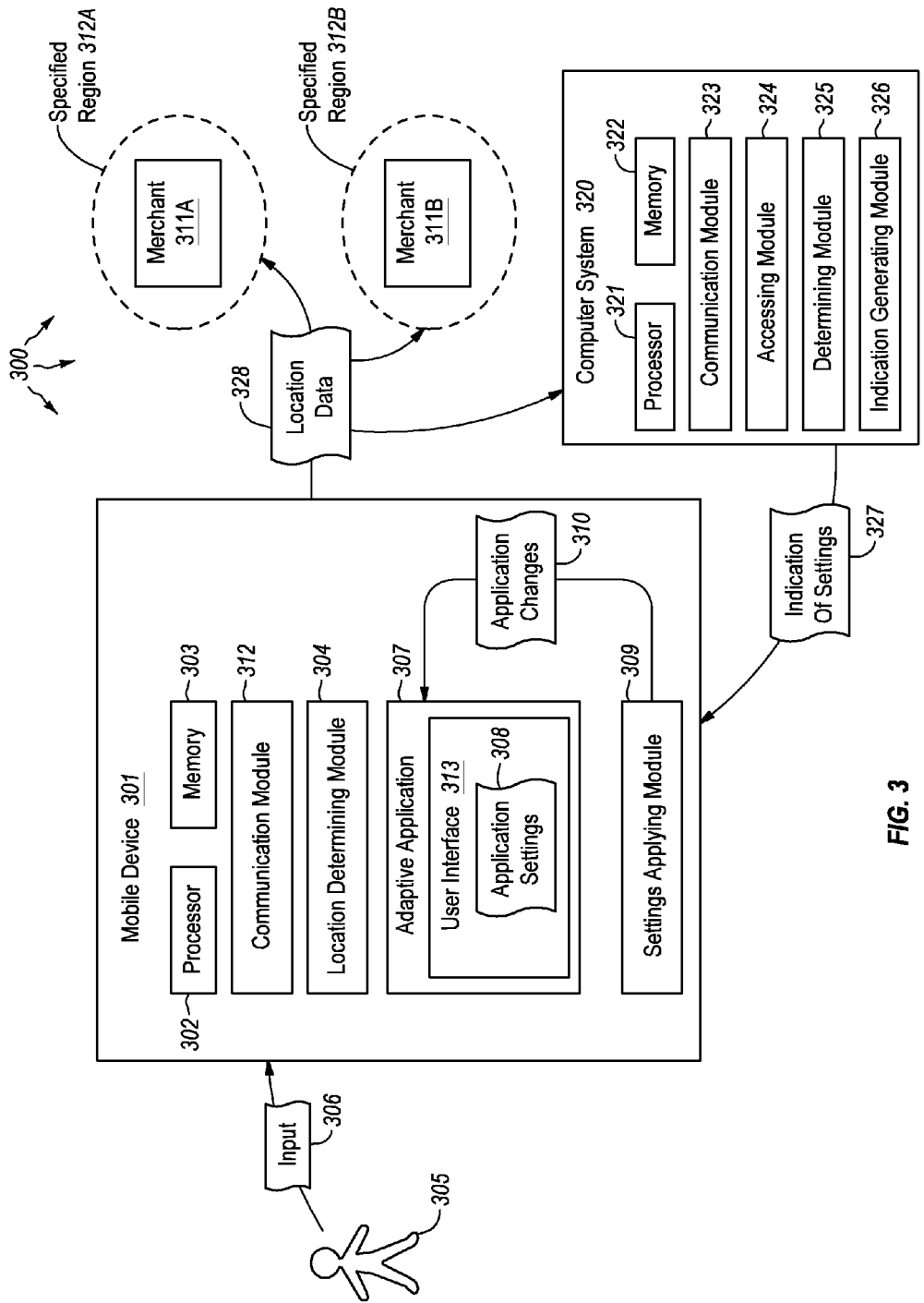
FIG. 3 illustrates a computing architecture in which merchant-specific functionality is provided for a plurality of different merchants based on location.

FIG. 3 describes a computing environment 300 in which a mobile device is used in a specific location. The mobile device 301 may be any type of mobile computing system including a smart phone, a feature phone, a tablet, a laptop, a smart watch or any other portable computing system capable of running executable code. The mobile device 301 includes at least one processor 302 and memory 303, as well as a communications module 312. The communications module 312 may include a receiver, a transmitter, or a transceiver capable of both transmitting and receiving data. The communications module 312 may, for example, receive wireless signals from beacons, antennae or other devices associated with merchants 311A and 311B. Communications between the mobile device and the devices of the merchants may notify the merchants that the user has entered their premises and, may also indicate to the adaptive application 307 that it is to change to take on the look and feel of the merchant.

While described in relation to different merchants (e.g. merchants 311A and 311B), it will be understood that the adaptive application 307 can be adapted based on its location regardless of where it is. As mentioned in one example above, a music player application may change based on determining that the user is on a running route. Similarly, an adaptive merchant application 307 may adapt based on a determination that it is near a specific merchant or group of merchants. Moreover, it will be understood that the terms "adaptive application" and "adaptive merchant application" both refer to an adaptable application, while the more specific "adaptive merchant application" refers to a specific use of the adaptive application 307 with merchants.

The mobile device 301 may include other modules for performing different types of functionality. For example, the mobile device 301 may include a settings applying module 309 that applies application changes 310 to the adaptive application. These changes may alter various application settings 308 including skins associated with the application, the placement of buttons, images, video, text or other application-related items. In some cases, the adaptive application 307 may take on the general look and feel of a merchant. In other cases, the adaptive application may take on a specified group of settings based on an outdoor location, or a user-identified location.

The computing environment 300 of FIG. 3 may also include other computer systems such as computer system 320. Computer system 320 may belong to one of the merchants or may belong to some other entity. The computer system 320 may be a distributed computing system such as a cloud computing system, or may be a local or mobile computing system. Like the mobile device 301, the computer system 320 includes at least one hardware processor 321 and memory 322, as well as a communications module 323. The computer system 320 may also include a data accessing module that accesses location indicators 328 sent out by the mobile computing device 307. The determining module 325 of computer system 320 may be configured to determine a user's location and determine that if the mobile device is in a certain location, that a certain set of settings are to be applied to the adaptive application 307. The indication generating module 326 may then generate an indication 327 of the settings that are to be applied to the adaptive application 307. These changes may be applied dynamically within the application, even if it is already running under different settings. These concepts will be explained further below with regard to methods 200 and 300 of FIGS. 2 and 3, respectively.

Figure 4:
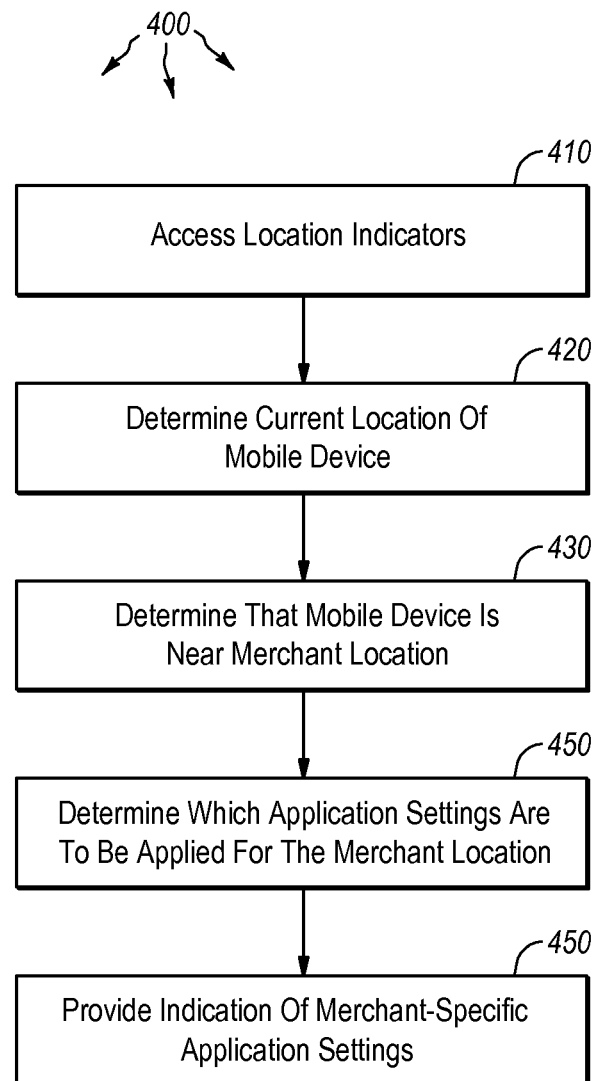
FIG. 4 illustrates a flowchart of a method for providing merchant-specific functionality for a plurality of different merchants.

In view of the systems and architectures described above, methodologies that may be implemented in accordance with the disclosed subject matter will be better appreciated with reference to the flow chart of FIG. 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

As shown in FIG. 4, a method 400 is illustrated for providing merchant-specific functionality for a plurality of different merchants. The computer system 320 may access location indicators 328 received in a data structure from mobile device 307 (410). The computer system 320 may receive location data from the mobile device 301 (which used its own location determining module 304 to determine its location), or may determine the mobile device's location based on other data received from the mobile device (such as a WiFi signal). The determining module 320 may then determine, based on the location indicators, a current location of the mobile device (420), and further determine, based on the mobile device's current location, that the mobile device is within a specified region in relation to a merchant location (430).

As shown in FIG. 3, the mobile device 301 may be within specified region 312A near merchant 311A, or within specified region 312B near merchant 311B. The location determining module 304 of the mobile device 301 may use a variety of different methods to determine the mobile device's current location and/or to determine whether the user is within a specified region (e.g. near a merchant, on a running trail, near a church, near a movie theater, etc.). The location may be determined using cellular geo-location (e.g. using GPS), in-store detection of a (low energy) blue tooth signal, in-store detection based on sound emitted by a speaker (e.g. high-pitched sound inaudible to human ears), active scanning of a QR code during a check in process, or passive scanning of a merchant location from an invisible watermark. Other methods of location detection may also be used. As the user moves from store to store, or place to place, the look and feel and/or the functionality of the adaptive application may change automatically (or at the request 306 of the user 305).

Continuing with the flowchart of FIG. 4, the computer system may further determine that one or more of a plurality of merchant-specific application settings are to be applied to an application on the mobile device, where the merchant has specified one or more merchant-specific application settings that are to be applied to the application when the mobile device is within the specified region in relation to the merchant location (440). The computer system then providing an indication of which merchant-specific application settings are to be applied to the application on the mobile device (450) such that the determined application settings are applied to the adaptive application on the mobile device 301.

Thus, if computer system 320 determines that the mobile device 301 is at merchant 311A (i.e. is within the specified region 312A in or around merchant 311A's physical location, the indication generating module 326 may generate indication of settings 327 which indicates those settings that are to be applied to the adaptive application 307. This indication of changes may cause an automatic and dynamic updating of application settings 308. These settings may include an indication of which application skin to use, or which payment account to use when paying for an item) or may change the actual functionality of the adaptive application 307. These changes may be implemented automatically and dynamically as the user moves from store to store (such as within a mall). As a single application may now be used with many different merchants, users may remove many of the merchant-specific applications off of their phones, freeing up valuable home screen real estate, and allowing for much more efficient user interactions with the mobile device.

As mentioned above, the application settings 308 may include at least one payment account preference indicating which payment account is to be used when purchasing items from that merchant. In some cases, the adaptive application 307 is a mobile wallet application, or includes mobile wallet functionality. In such cases, the mobile wallet application would include access to various payment accounts including debit accounts, credit accounts, loyalty points or other value stores. The user may have payment preferences for different stores. For example, the user may wish to use a store-specific credit card for payment at merchant 311A, and may wish to use a debit card at merchant 311B. These payment preferences may be received from the user 305 (e.g. in input 306) at the time or purchase or at some earlier point in time (such as during application registration), and may be applied automatically during the time of purchase. In this manner, the user may shop at multiple different stores and pay for items using store-specific credit cards at each store, all while using the same adaptive merchant application 307. Optionally, the user may use the specified default payment account when shopping at a given merchant, or may override the default and specify which account the payment is to be drawn from.

In another embodiment, when a user goes to a specific merchant location (e.g. 311A), the settings applying module 309 may select one or more merchant-specific coupons or offers based on the determined merchant location, and apply the coupons or offers automatically upon checkout. For instance, if merchant 311A is a restaurant, and the user has dined there previously and has accrued loyalty points, or has otherwise received coupons or offers (e.g. via email or text directly to the mobile device 301), these loyalty points, coupons or offers may be applied when the user pays for the bill using the adaptive merchant application 307. The user's default payment account may be used in conjunction with the points/coupon/offer to cover the full balance. As a result of the user's purchase, the user 305 may accrue additional restaurant-specific loyalty points for purchasing from that merchant location. Similarly, if other (perhaps commonly owned) stores provide loyalty points or coupons, the user may receive those points in their adaptive merchant application for use in subsequent visits. Furthermore, in some cases, users may receive coupons or loyalty points simply for being in the store. As such, the adaptive application 307 may be updated to reflect these coupons or loyalty points upon entering the merchant's premises.

Still further, as mentioned above, the application settings 308 may include a skin preference for the determined merchant. Thus, for example, if a user has entered within the specified region 312B (e.g. a geofence defined by GPS coordinates), the adaptive merchant application 307 may apply a skin that is specific to merchant 311B. The skin may include graphics, colors, trademarks, logos or other characteristics of merchant 311B. Thus, the application will have the look and feel of the merchant. As such, merchants may provide desired skins for use by the adaptive application. The user, however, may be able to override the merchant's preference and use their own skin, or the adaptive application's own native skin.

The skin may be applied automatically upon entering the determined merchant location. Thus, if the user is at a mall and enters a game store, the adaptive application may take on the skin for the game store. The skin may be automatically applied as the user enters the specified region, and may be applied dynamically even when the application is already open. Similarly, if the application is not open, the icon for the application may be changed to include a store-provided icon or may include watermarks or other features indicative of that store. Then, as the user moves to another store, restaurant or other location, that store's store-specific settings are automatically applied to the application. In this manner, a user may install one adaptive application that can be used in a variety of situations to provide different functionality, and may change its look and feel based on location.

Figure 5:
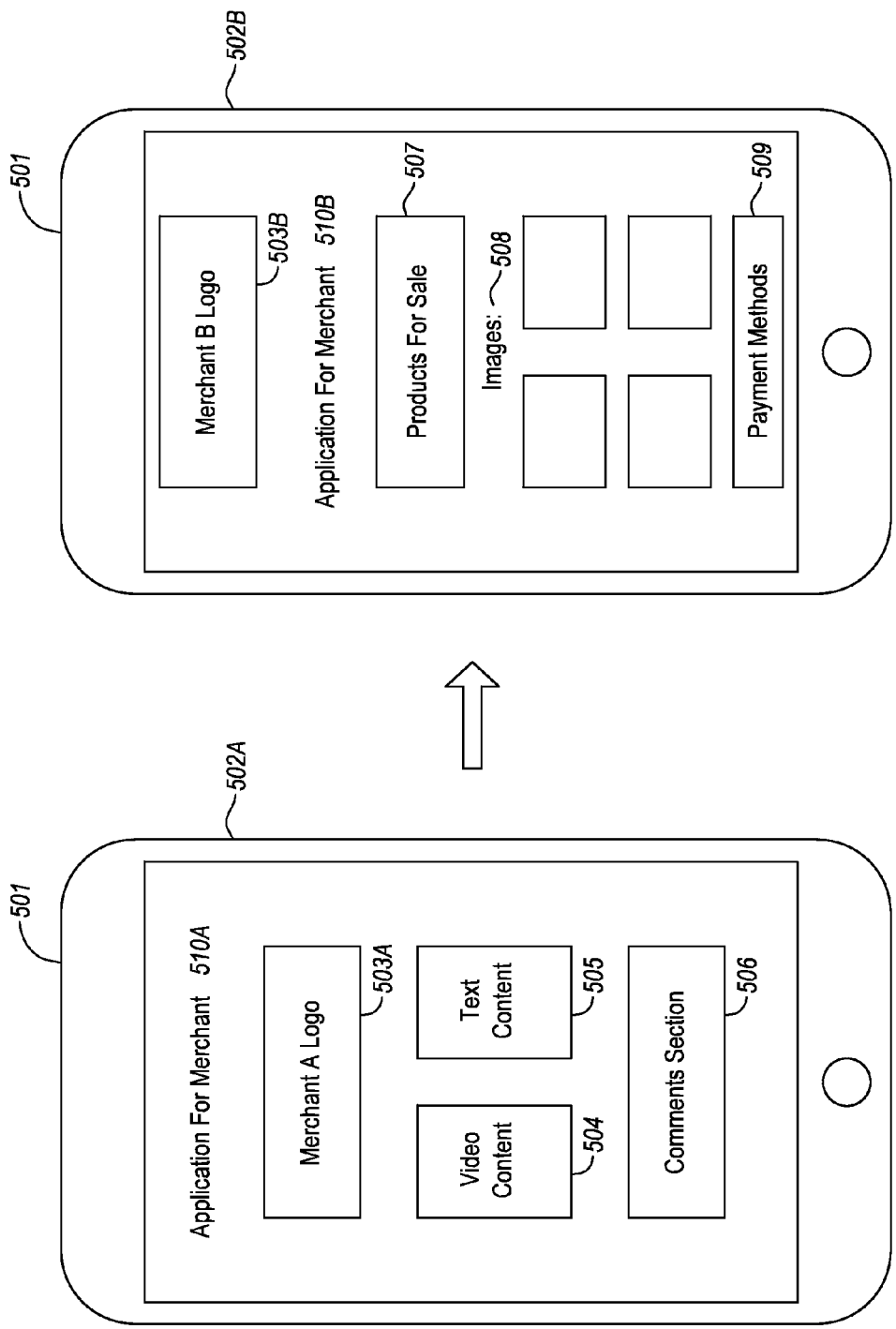
FIG. 5 illustrates an embodiment in which an application skin is dynamically changed upon entering another merchant's location.

One example embodiment of an adaptive application is shown in FIG. 5. A mobile device 501 such as a mobile phone runs an application for a merchant. The adaptive application may be run for one merchant 510A (or other entity), while the same adaptive application may be run for another merchant 510B (or other entity). The adaptive application may have a skin 502 which includes certain backgrounds, application layouts, colors, fonts, images, logos or other elements associated with an application skin. Thus, as can be seen in FIG. 5, the skin 502A for merchant 510A includes Merchant A's logo, below which video content 504, text content 505 and a comments section 506 may be found. Whereas the skin 502B for Merchant B may include the Merchant B logo 503B along with various products for sale 507, images of products 508, and may further include a button that allows the user to select the method of payment 509. Accordingly, the same adaptive application may include different logos, different layouts, different color schemes, different content and different placement of items on the screen. As such, the adaptive application may take on an entirely new form when located in different locations.

In another embodiment, a computer system 320 is provided that includes processor 321, a communications module 323 (e.g. a transceiver), and a data accessing module 324 configured to access location indicators received by the transceiver, where the location indicators 328 are transmitted in a data structure from a mobile device. The computer system 320 further includes a determining module 325 that performs the following: determines, based on the accessed location indicators in the received data structure, a current location of the mobile device, determines, based on the determined current location of the mobile device, that the mobile device is within a specified region in relation to a merchant location, and determines that merchant-specific application settings are to be applied to an adaptive application on the mobile device, where the merchant has specified merchant-specific application settings that are to be applied to the adaptive application when the mobile device is within the specified region in relation to the merchant location. The computer system further includes an indication generating module 326 that generates an indication of application settings 327 that are to be applied to the adaptive application on the mobile device.

In some cases, the settings applying module 309 of the mobile device 301 is configured to receive the indication of settings 327 from the computer system 320 and apply the merchant-specific application settings to the adaptive application even if the adaptive application is already open. As shown in FIG. 5, the merchant-specific application settings for one merchant provide at least some portion of application functionality that is different than application functionality provided by another merchant. The merchant-specific application settings may provide access to merchant-specific downloadable features for the adaptive application 307, may provide access to merchant-specific coupons or offers or may provide access to merchant-specific payment options. Indeed, as shown in FIG. 5, the skin 502B for merchant 510B includes a payment options button 509 that may include merchant-specific payment options such as electronic currency (e.g. Bitcoin), store-specific stored value cards (i.e. gift cards), store-specific credit cards or other payment methods.

In another embodiment, a computer program product is provided which comprises one or more computer storage media having thereon computer-executable instructions that, when executed by processor 321 of computing system 320, cause the computing system to instantiate a user interface 313 on a mobile device 301, where the user interface comprises the following: a dynamically changeable skin that is updatable to include merchant-specific elements associated with a merchant, where the dynamically changeable skin changes based on the location of the mobile device, one or more dynamically changeable user interaction elements that allow the user to interact with the application represented by the user interface, where the dynamically changeable user interaction elements change based on the location of the mobile device, and an application data portion that presents application data. Again, as shown in FIG. 5, the skins 502A and 502B associated with Merchants 510A and 510B, respectively, each have different logos, different types of content, different payment methods and other content differences that are not shown.

The user interface 313 of the adaptive application 307 may by dynamically updated as the mobile device changes locations. For example, if a mobile device crosses a geofence, it may have entered the specified region (e.g. 312A) of another merchant, and the adaptive application may adapt dynamically to the new merchant's specified settings. By only having a single application, data storage resources are reduced, and memory usage is reduced as fewer applications are running concurrently. The user interface 313 of the adaptive application is highly efficient and may dynamically change its skin to present the look and feel of different merchants on the application as the user is travelling between stores or other locations. This prevents the user from having to switch to different merchant-specific applications each time they go to a new store or new location. Moreover, the dynamically changeable user interaction elements may present coupons, rewards or other offers to an application user and, upon selection by a user, may apply those coupons or offers to a payment between the user and the merchant. In this manner, a single adaptive application may be used in many different venues, and may take on the characteristics of that venue.

Figure 6:
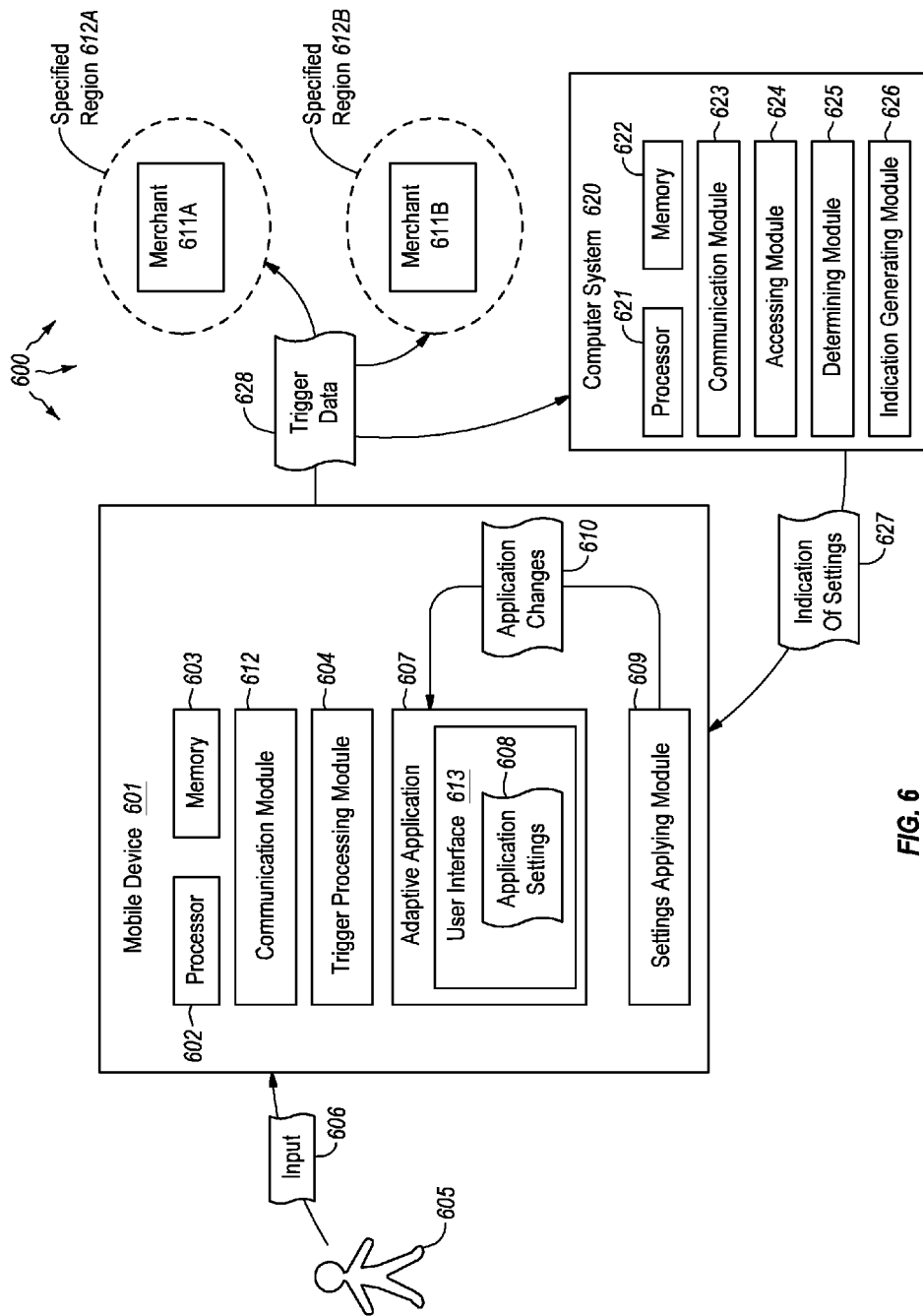
FIG. 6 illustrates a computing architecture in which merchant-specific functionality is provided for a plurality of different merchants based on triggers.

FIG. 6 describes a computing environment 600 in which a mobile device is used in a specific location. The mobile device 601 may be any type of mobile computing system including a smart phone, a feature phone, a tablet, a laptop, a smart watch or any other portable computing system capable of running executable code. The mobile device 601 includes at least one processor 602 and memory 603, as well as a communications module 612. The communications module 612 may include a receiver, a transmitter, or a transceiver capable of both transmitting and receiving data. The communications module 612 may, for example, receive wireless signals from beacons, antennae or other devices associated with merchants 611A and 611B. Communications between the mobile device and the devices of the merchants may notify the merchants that the user has entered their premises and, may also indicate to the adaptive application 607 that it is to change to take on the look and feel of the merchant.

While described in relation to different merchants (e.g. merchants 611A and 611B), it will be understood that the adaptive application 607 can be adapted based on detected triggers regardless of where it is. As mentioned in one example above, a music player application may change based on determining that the user is on a running route. Similarly, an adaptive merchant application 607 may adapt based on a determination that it is near a specific merchant or group of merchants. Moreover, as with FIG. 3, it will be understood that the terms "adaptive application" and "adaptive merchant application" both refer to an adaptable application, while the more specific "adaptive merchant application" refers to a specific use of the adaptive application 607 with merchants.

The mobile device 601 may include other modules for performing different types of functionality. For example, the mobile device 601 may include a settings applying module 609 that applies application changes 610 to the adaptive application. These changes may alter various application settings 608 including skins associated with the application, the placement of buttons, images, video, text or other application-related items. In some cases, the adaptive application 607 may take on the general look and feel of a merchant. In other cases, the adaptive application may take on a specified group of settings based on an outdoor location, or a user-identified location (e.g. after receiving input 606 from user 605).

The computing environment 600 of FIG. 6 may also include other computer systems such as computer system 620. Computer system 620 may belong to one of the merchants or may belong to some other entity. The computer system 620 may be a distributed computing system such as a cloud computing system, or may be a local or mobile computing system. Like the mobile device 601, the computer system 620 includes at least one hardware processor 621 and memory 622, as well as a communications module 623. The computer system 620 may also include a data accessing module that accesses trigger data 628 sent out by the mobile computing device 607. The determining module 625 of computer system 620 may be configured to determine a user's location and determine that if the mobile device is in a certain location, that a certain set of settings are to be applied to the adaptive application 607. The indication generating module 626 may then generate an indication 627 of the settings that are to be applied to the adaptive application 607. These changes may be applied dynamically within the application, even if it is already running under different settings.

The computer system 620 may access trigger signals 628 received in a data structure from mobile device 607 (410). The computer system 620 may receive trigger signal data structures from the mobile device 601 (which used its own trigger processing module 604 to determine the configuration settings). The determining module 620 may then determine, based on the trigger signals, a configuration setting of the mobile device (420.

As shown in FIG. 6, the mobile device 601 may be within specified region 612A near merchant 611A, or within specified region 612B near merchant 611B. The trigger processing module 604 of the mobile device 601 may use a variety of different methods to determine the mobile device's configuration settings. Combinations of triggers can be used to determine specific configuration changes as further described in FIGS. 11 and 12 below.

Figure 7:
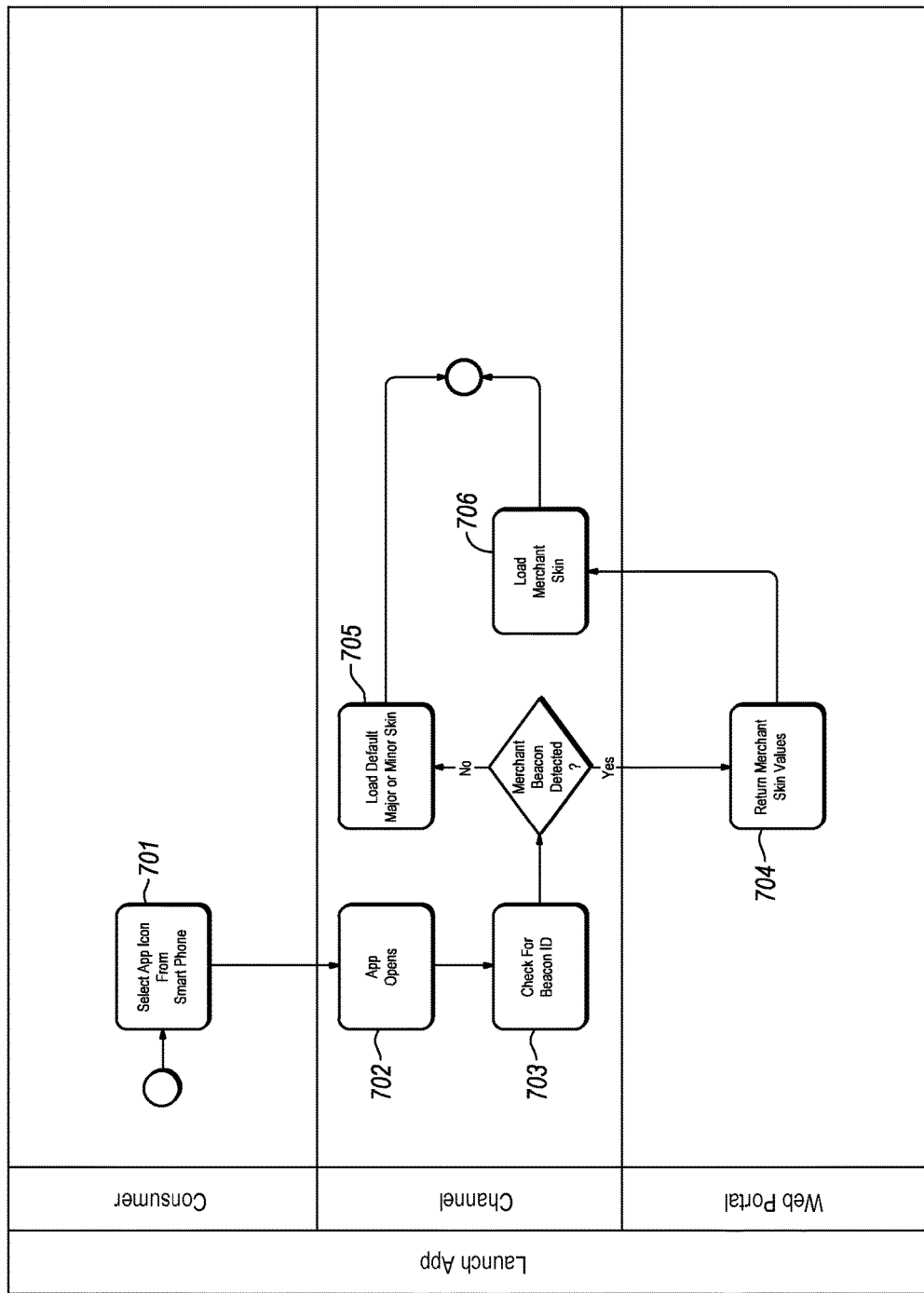
FIG. 7 illustrates a process flow describing the sequence of steps required to launch the application.

FIG. 7 illustrates an embodiment of a process flow describing a sequence of steps used to launch the application comprised of a consumer, a channel which is a mobile device of the consumer, and a web portal. In step 701, the consumer selects an application icon from a smart phone. In response to the user input, the application opens in the channel (step 702). In step 703, the channel checks for a local beacon ID. In step 704, if a local beacon ID is detected, the web portal delivers the values to the channel, which will allow the channel (at step 706) to configure the user interface (e.g. the UI skin). Alternatively, at step 704, if a local beacon ID is not detected, the channel may load the default skin for the application.

Figure 8:
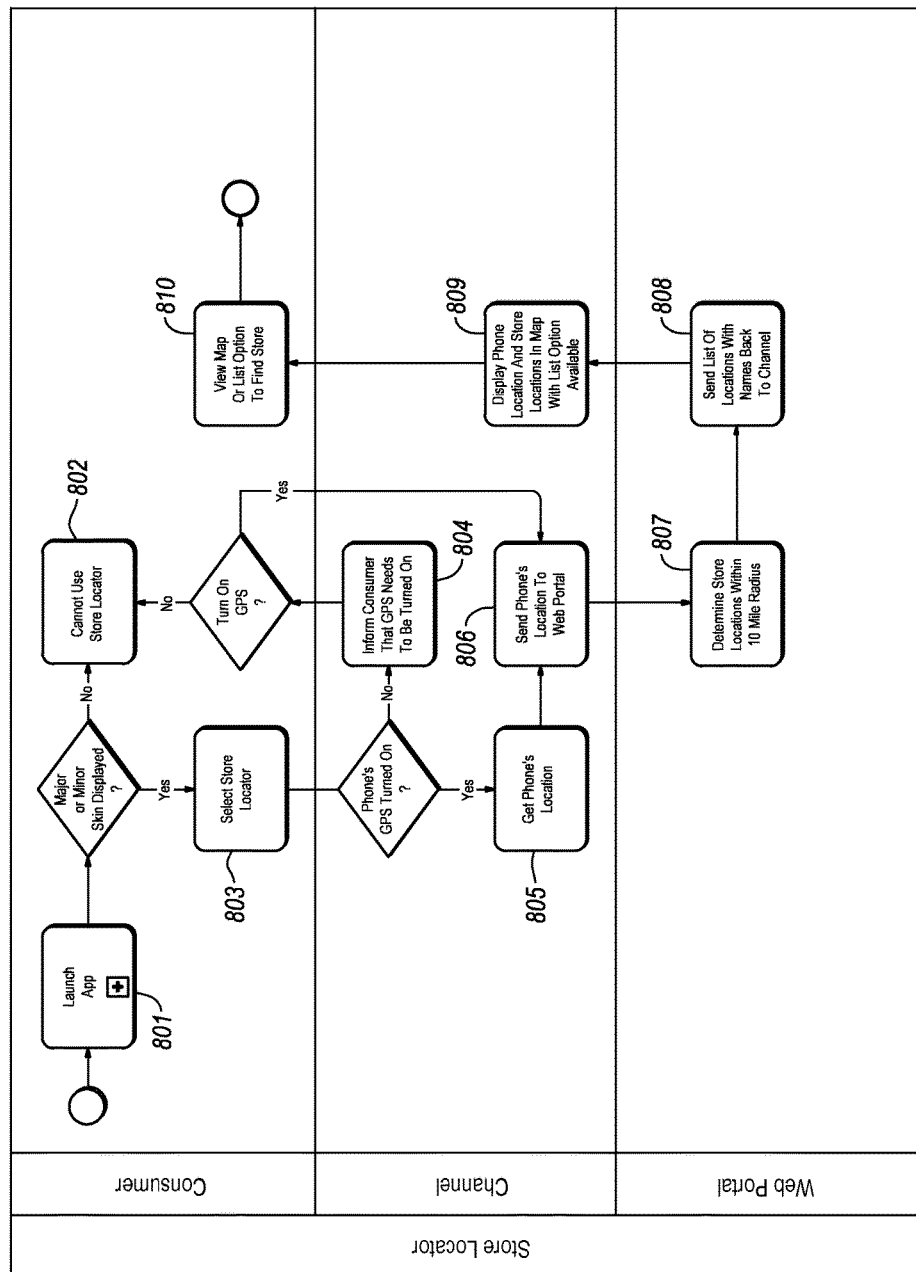
FIG. 8 illustrates a process flow describing the sequence of steps required to locate a store.

FIG. 8 illustrates an embodiment of a process flow describing a sequence of steps used to locate a store comprised of a channel which is a mobile device of the consumer and a web portal. In step 801, the consumer launches the application. Responding to the input from the consumer, the launched application checks to determine if a default (Major) skin is currently displayed. If not, the application (in step 802) cannot use the store locator function associated with the Major skin. If a Major skin is displayed, using step 803, the store locator function may be activated by the consumer. Upon activating the store locator function, the channel checks to determine if the GPS of the channel is turned on. If the GPS of the channel is not turned on, the channel (at step 804) sends a message to the consumer informing the consumer that the GPS is to be turned on in order to use the store locator function.

In response to the message from the channel, the consumer can turn on the GPS (or other similar radio) of the channel. If the consumer turns on the GPS, the channel sends its location information to the web portal as shown in step 806. If the channel previously determined that the GPS was turned on, the channel obtains its location using step 805, and the channel sends its location information to the web portal as shown in step 806. In response to the message received from the channel, at step 807, the web portal determines store locations within a defined radius based on configuration settings. Having determined the store locations, at step 808, the web portal sends the list of locations back to the channel. At step 809, the channel displays the locations to the consumer. The process is completed with step 810, where the consumer views the list of locations.

Figure 9:
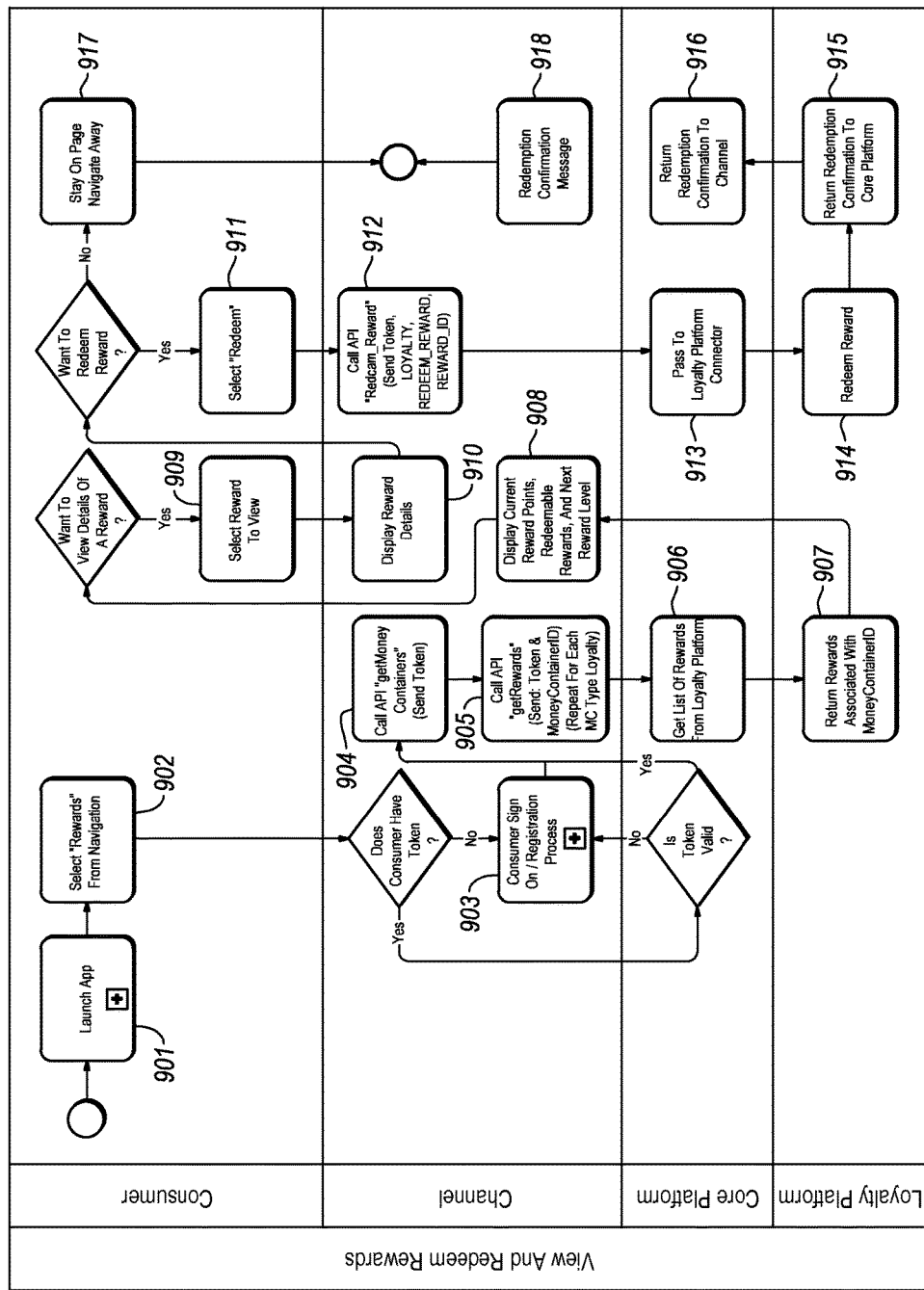
FIG. 9 illustrates a process flow describing the sequence of steps required to review and redeem coupons.

FIG. 9 illustrates an embodiment of a process flow describing a sequence of steps used to review and redeem coupons comprised of a channel which is a mobile device of the consumer, a core processing platform and a loyalty platform. At step 901, the consumer launches the mobile application. At step 902, the consumer selects 'Rewards' as an option on the navigation of the mobile application. In response to input from the consumer, the channel determines if the consumer has a token. If the consumer has a token, the token is transmitted to the core platform for validation. If the consumer does not have a token, the consumer registers or signs on to the mobile application (step 903). Although the registration process is not shown in its entirety, the completion of step 903 results in a token which is made available to step 904.

In step 904, the channel calls an API which determines the ID of a money container associated with the registered mobile application of the consumer. The money container ID and associated token are used by step 905 to determine the rewards programs available for the registered consumer. Using the results of step 905, the core platform obtains a list of rewards using an application programming interface (API) of the loyalty platform. At step 907, the loyalty platform returns the list of rewards programs that are currently associated with the registered consumer, and the list is returned to the channel device of the consumer. In step 908, the channel device of the consumer displays one or more of the current rewards points, redeemable rewards, and the next available reward level. In response to the display of reward information, the consumer can determine whether to display the details associated with the rewards programs in step 909.

Responsive to the input of the consumer, the channel displays the reward details at step 910. In response to the display of reward details, the consumer can determine whether to redeem an available reward at step 911. Alternatively, the consumer can step on the navigation page or navigate away at step 917. Responsive to the input by the consumer to 'Redeem', the channel calls an API of the core platform which sends a message including parameters designated for the token such as loyalty points, redeem reward, and reward ID. The core platform forwards message to the loyalty platform using step 913. Responsive to the message received from the core platform, the loyalty platform redeems (step 914) the selected rewards of the consumer and creates a redemption confirmation message (step 915) to the core platform. The core platform returns the redemption confirmation message to the channel at step 916. The process is completed in step 918 wherein the channel displays the redemption confirmation message.

Figure 10:
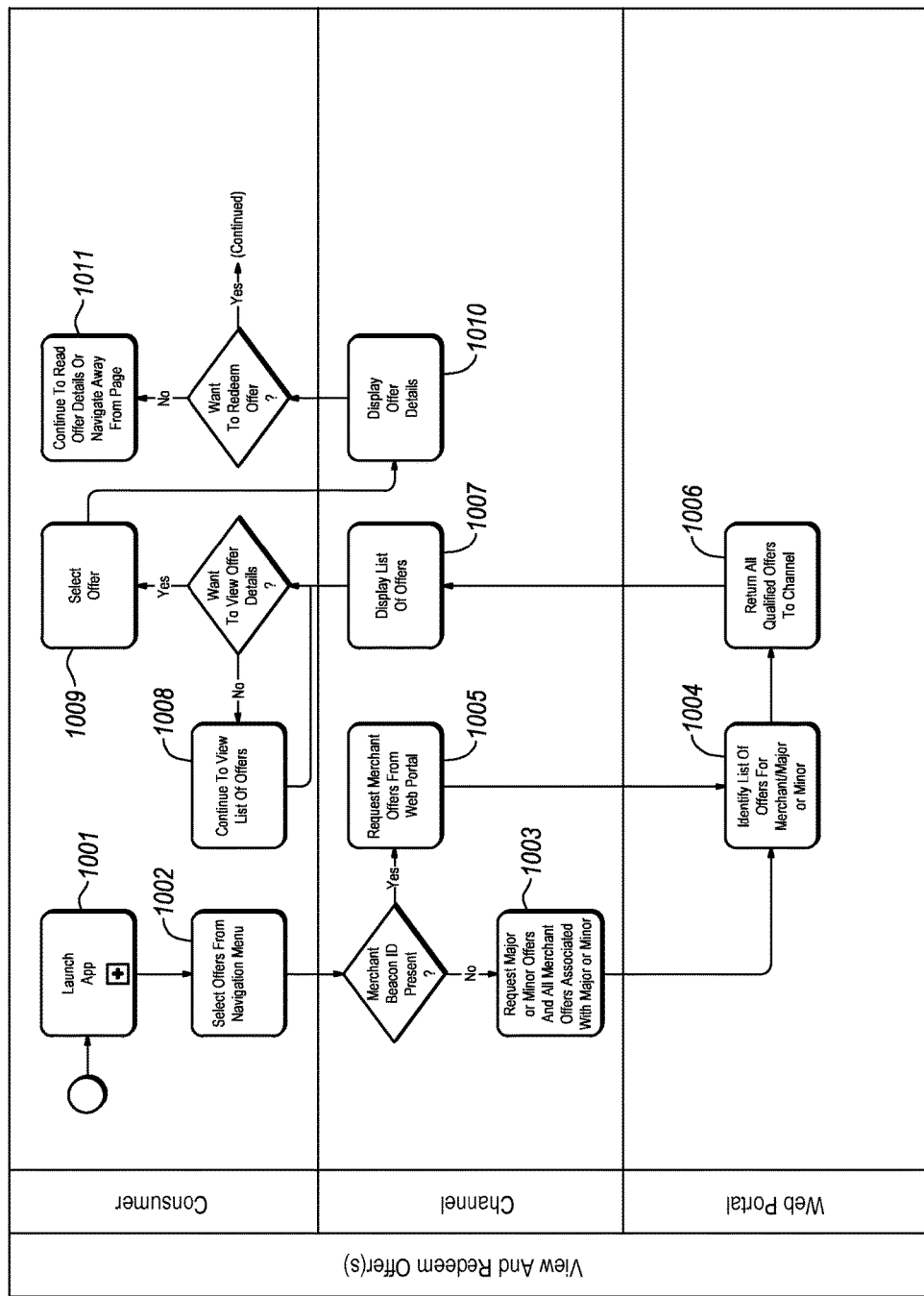
FIG. 10 illustrates a process flow describing the sequence of steps required to review and redeem rewards.
Figure 10:
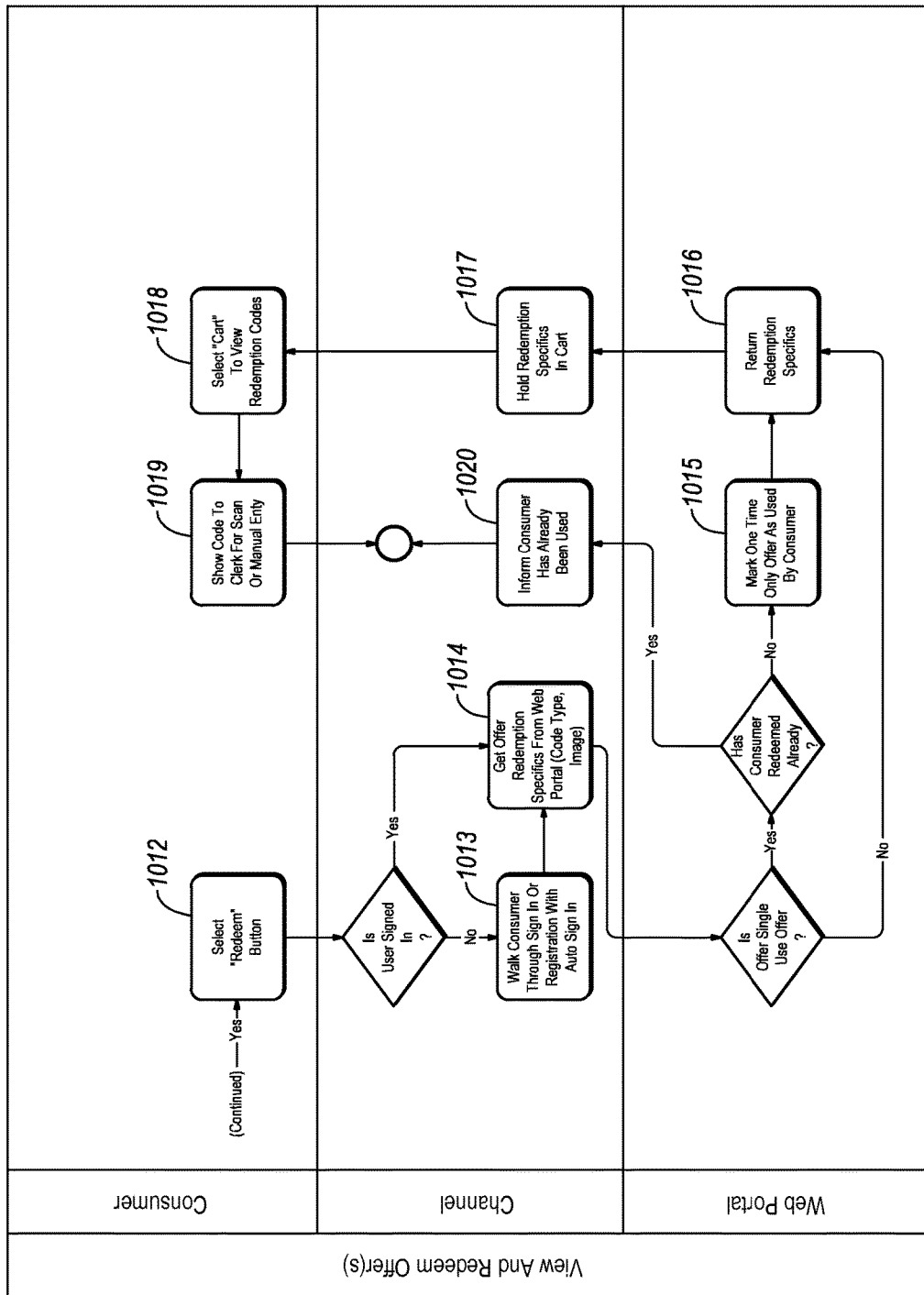

FIG. 10 illustrates an embodiment of a process flow describing a sequence of steps used to review and redeem rewards comprised of a channel which is a mobile device of the consumer and a web portal. The consumer launches the mobile application at step 1001 and selects "Offers" from the navigation menu of the mobile application at step 1002. The channel application determines if a merchant beacon ID is available. If a merchant beacon ID is available, the channel a list of available merchant offers from the web portal in step 1005. If a list of merchants is not available, the channel can request a list of available offers associated with the default (Major) merchant using step 1003. Responsive to the request(s) from the channel, the web portal can identify a list of offers for the consumer in step 1004. The identified list of offers is returned by the web portal to the channel in step 1006. The channel can display the list of offers using step 1007.

Responsive to the display of offers, the consumer can view details associated with an offer (step 1009) or the consumer can continue to view the list of available offers in step 1008. If the consumer selects an offer using step 1009, the channel, responsive to the consumer's selection displays the details of the offer in step 1010. Responsive to the display of offers by the channel, the consumer can continue to view the offer details (step 1011) or the consumer can select a specific offer to redeem using step (1012). If the consumer is not currently signed into the mobile application, the channel facilitates the sign-in or registration process using step (1013). If the consumer is already signed into the mobile application, the channel calls an API to obtain the specific details associated with the offer selected for redemption. A message is sent to the web portal consisting of the redemption code type and redemption code image.

Responsive to the message received from the channel, the web portal determines if the redemption is associated with an offer than be redeemed a single time. If the offer is of a type that can be redeemed a single time and if the consumer has already redeemed the selected offer, the web portal sends a message to the channel informing the consumer that offer has already been used (step 1020). However, if the offer has not been previously redeemed, the web portal marks the offer as used by the consumer in step (1015). The web portal returns a redemption message to the channel in step (1016). Responsive to the message, the channel is operable to hold the redeemed offer in a shopping cart included within the mobile application (step 1017). Responsive to the display of the offer in the shopping cart, the consumer can select 'cart' to view the redemption codes using step (1018). At step (1019), the consumer can use the display of the mobile application to show an employee of the merchant the redemption code.

Figure 11:
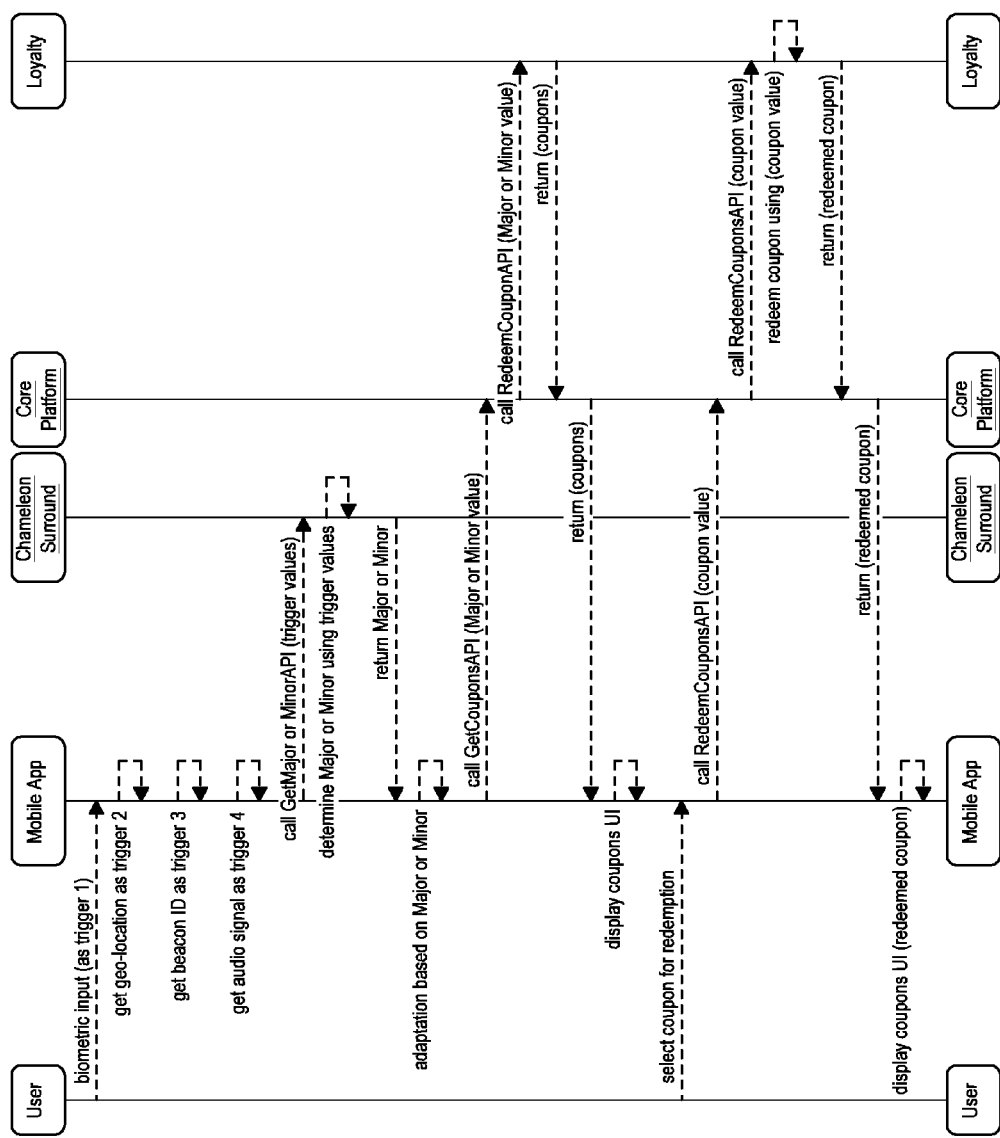
FIG. 11 illustrates a sequence diagram describing the key interactions between the user, mobile device, surround, core, and the loyalty system in connection with a coupon redemption.

FIG. 11 illustrates an embodiment of a sequence diagram describing interactions between the user, mobile device, surround, core, and the loyalty system in connection with a coupon redemption. The user initiates the coupon redemption process by providing a biometric factor as input to the mobile application. Biometric input may be, for example, a fingerprint, voice, facial scan, or other unique biometric factor of the user. Based on the settings for this user, the mobile application is operable to search for and record multiple additional trigger values as contextual values associated with the environment. Additional trigger values may include geo-location (shown as trigger value 2), a beacon ID (shown as trigger value 3), and an audio signal (shown as trigger value 4).

Having now received the biometric input of the user and at least one additional trigger value, the mobile application is operable to determine the Major or Minor value associated with the current environment. The default setting for the mobile application is considered the Major value. Other settings for the mobile application are each considered Minor values. While there is only one Major value associated with the mobile application, there may be an unlimited number of minor values. If the environment is a merchant location, the Major or Minor value is associated with the merchant. If the environment is a venue other than a merchant (a baseball stadium for example), the Major or Minor value associated with the baseball stadium is returned. If and as the user continues to move within the geofence associated with the Major or Minor value, the mobile application is operable to continue to search for and accept additional trigger values from the environment. The mobile application is operable to adapt its user interface based on the current Major or Minor value and additional trigger values. The mobile application is further operable to use an API (e.g. a "GetCouponsAPI") using its then Major or Minor value to obtain and display a list of the coupons available to the user. The user can then select and redeem a coupon using the user interface of the mobile application.

Figure 12:
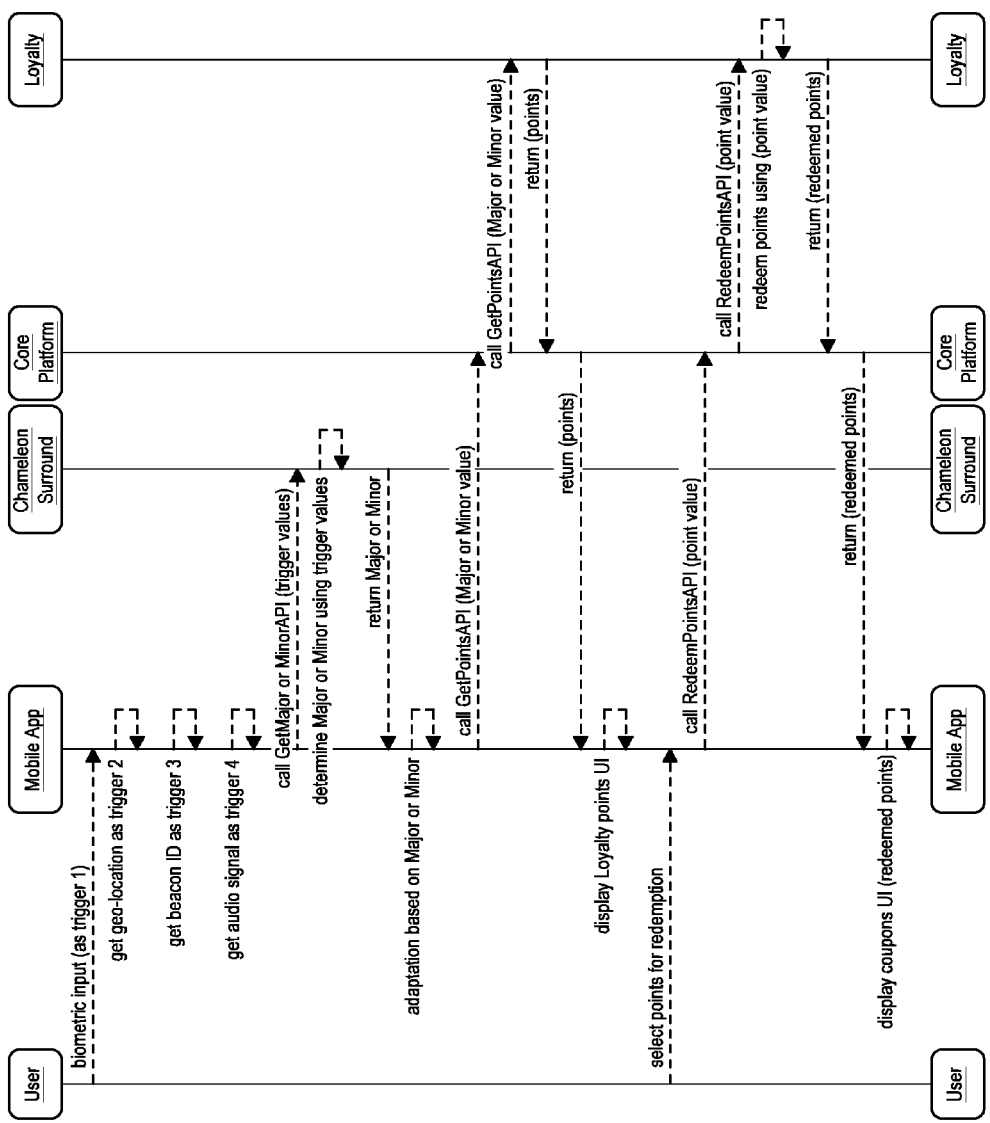
FIG. 12 illustrates a sequence diagram describing the key interactions between the user, mobile device, surround, core, and the loyalty system in connection with a loyalty redemption.

FIG. 12 illustrates an embodiment of a sequence diagram describing interactions between the user, mobile device, surround, core platform, and the loyalty platform in connection with a loyalty redemption. The user initiates the loyalty redemption process by providing a biometric factor as input to the mobile application. Biometric input may be one of a fingerprint, voice, facial scan, or other unique biometric factor of the user. Based on the settings for this user, the mobile application is operable to search for and record multiple additional trigger values as contextual values associated with the environment. Additional trigger values may include geo-location (shown as trigger value 2), a beacon ID (shown as trigger value 3), and an audio signal (shown as trigger value 4).

Having now received the biometric input of the user and at least one additional trigger value, the mobile application is operable to determine the Major or Minor value associated with the current environment. The default setting for the mobile application is considered the Major value. Other settings for the mobile application are each considered Minor values. While there is only one Major value associated with the mobile application, there may be an unlimited number of minor values. If the environment is a merchant location, the Major or Minor value is associated with the merchant. If the environment is a venue other than a merchant (a shopping mall for example) the Major or Minor value associated with the shopping mall is returned. If and as the user continues to move within the geo-fence associated with the Major or Minor value, the mobile application is operable to continue to search for and accept additional trigger values from the environment. The mobile application is operable to adapt its user interface based on the current Major or Minor value and additional trigger values. The mobile application is further operable to use the GetPointsAPI using its current Major or Minor value to obtain and display a list of the loyalty points available to the user. The user can then select and redeem loyalty points using the user interface of the mobile application.

Figure 13:
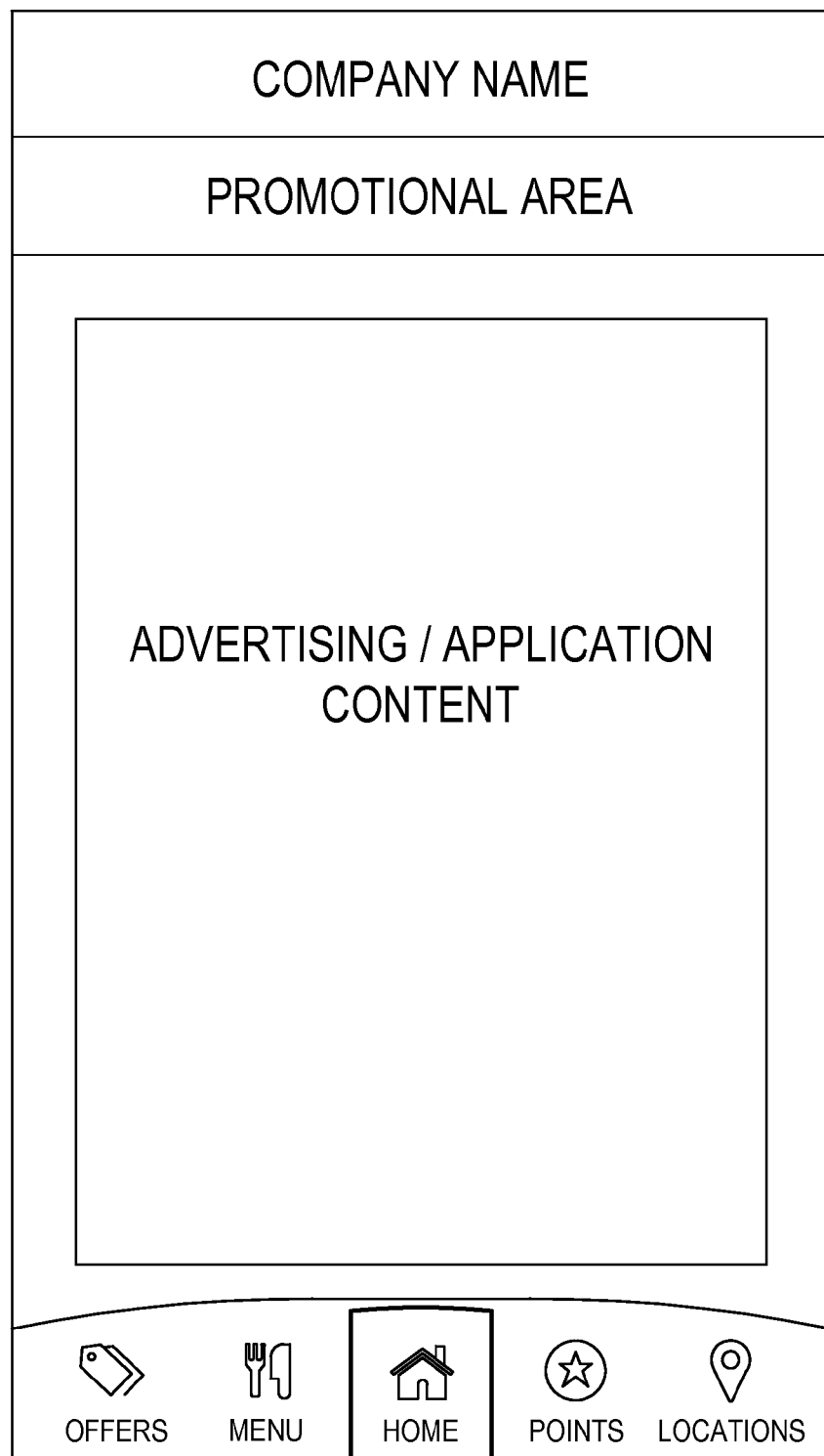
FIG. 13 illustrates an example embodiment of a user interface which includes a company name, a promotional area and advertising or application content.

For example, the user may use the user interface shown in FIG. 13 to select and redeem loyalty points. The UI may, for example, show a company name at the top as well as a promotional area that shows current offers or promotions available at that company's store. The advertising area/application content area may show a familiar company logo or a video pictorial advertisement for that company. The consumer may browse the application's UI using any of the buttons displayed at the bottom of the UI including the "Offers" button (which displays available offers), the "Menu" button (which displays a menu for the company in cases where the company is a restaurant), the "Home" button (which takes the user to the main display for that application (i.e. to the Major value or default location), the "Points" button (which shows the user's available loyalty points), or the "Locations" button (which shows other locations of the company's stores). It will be understood that this example UI is just one example and that other navigations buttons may be used, and that other content such as games or product displays or chat applications or other content may be displayed within the UI in addition to or as an alternative to the content shown in FIG. 13.

It should be noted that various modifications and changes may be made without departing from the spirit and scope of the present invention. Consequently, these and other modifications are contemplated to be within the spirit and scope of the following claims.

We claim:

1. A hand-held portable device comprising:
    a display;
    one or more processors; and
    one or more computer-readable hardware storage media having stored thereon computer-executable instructions that are executable by the one or more processors to cause the hand-held portable device to provide merchant specific functionality for a plurality of different merchants by causing the hand-held portable device to:
        execute an adaptive application, wherein the adaptive application is associated with a single launch icon that is displayed on a main launch screen of the hand-held portable device, and wherein the single launch icon automatically changes appearance based on changing merchant-specific application settings that are applied to the adaptive application in response to different triggering factors;
        access one or more location indicators received in a data structure, the data structure being received by a transceiver of the hand-held portable device;
        based on the accessed one or more location indicators in the received data structure, determine a current location of the hand-held portable device;
        based on the determined current location of the hand-held portable device, determine that the hand-held portable device is within a specified region in relation to a merchant location;
        determine that one or more of a plurality of merchant-specific application settings are to be applied to the adaptive application on the hand-held portable device when (1) the hand-held portable device is within the specified region in relation to the merchant location and (2) at least one biometric trigger has been received, the biometric trigger comprising at least one of a fingerprint scan, a facial scan, or a voice print; and
        provide an indication of the one or more merchant-specific application settings that are to be applied to the adaptive application on the hand-held portable device, wherein one or more different merchant-specific application settings are automatically and dynamically applied by the adaptive application upon the hand-held portable device entering a second, different merchant location, such that one or more portions of functionality provided by the adaptive application are dynamically changed according to the one or more different merchant-specific application settings for the second, different merchant location, and wherein the single launch icon also automatically changes in appearance upon application of the one or more different merchant-specific application settings.

2. The hand-held portable device of claim 1, wherein the plurality of merchant-specific application settings comprises at least one payment account preference indicating which payment account is to be used when purchasing items from that merchant.

3. The hand-held portable device of claim 2, further comprising receiving payment account preferences during an application registration.

4. The hand-held portable device of claim 2, wherein the plurality of merchant-specific settings includes an indication of a default payment account for the merchant location.

5. The hand-held portable device of claim 2, further comprising:
  identifying one or more merchant-specific coupons or offers provided by the merchant location; and
  applying the one or more coupons or offers automatically upon checkout.

6. The hand-held portable device of claim 5, further comprising accruing store-specific merchant loyalty points upon a purchase being performed while the hand-held portable device is located within the specified region in relation to the merchant location.

7. The hand-held portable device of claim 1, wherein the plurality of merchant-specific application settings comprises a specified skin for the adaptive application, the skin comprising a look and feel of a brand of a particular merchant, such that the adaptive application looks and feels like an application provided by the particular merchant.

8. The hand-held portable device of claim 7, wherein the adaptive application skin is applied dynamically and automatically upon entering the specified region surrounding the merchant location.

9. The hand-held portable device of claim 8, wherein the entering the specified region surrounding the merchant location comprises entering an established geofence.

10. The hand-held portable device of claim 7, wherein one or more different merchant-specific settings are automatically and dynamically applied upon entering the second, different merchant location.

11. A computer system comprising:
  at least one processor;
  a transceiver; and
  a determining module that performs the following one or more computer-readable hardware storage devices having stored thereon computer-executable instructions that are executable by the at least one processor to cause the computer system to:
    execute an adaptive application, wherein the adaptive application is associated with a single launch icon that is displayed on a main launch screen of the computer system, and wherein the single launch icon automatically changes appearance based on changing merchant-specific application settings that are applied to the adaptive application in response to different triggering factors;
    based on location indicators that are received at the computer system in a data structure, determine a current location of the computer system;
    based on the determined current location of the computer system, determine that the computer system is within a specified region in relation to a merchant location;
    determine that one or more of a plurality of merchant-specific application settings are to be applied to the adaptive application on the computer system when (1) the computer system is within the specified region in relation to the merchant location and (2) at least one biometric trigger has been received, the biometric trigger comprising at least one of a fingerprint scan, a facial scan, or a voice print; and
    generate an indication of the one or more merchant-specific application settings that are to be applied to the adaptive application on the computer system, wherein one or more different merchant-specific application settings are automatically and dynamically applied by the adaptive application upon the computer system entering a second, different merchant location, such that one or more portions of functionality provided by the adaptive application are dynamically changed according to the one or more different merchant-specific application settings for the second, different merchant location, and wherein the single launch icon also automatically changes in appearance upon application of the one or more different merchant-specific application settings.

12. The computer system of claim 11, wherein applying the one or more merchant-specific application settings to the adaptive application is performed even if the adaptive application is already open.

13. The computer system of claim 11, wherein first merchant-specific application settings provide at least some portion of application functionality that is different than application functionality provided by second merchant-specific application settings.

14. The computer system of claim 11, wherein the one or more merchant-specific application settings provide access to merchant-specific downloadable features for the adaptive application.

15. The computer system of claim 11, wherein the one or more merchant-specific application settings provide access to merchant-specific coupons or offers.

16. The computer system of claim 11, wherein the one or more merchant-specific application settings provide access to merchant-specific payment options.

17. One or more computer-readable hardware storage devices having stored thereon computer-executable instructions that are executable by one or more processors of a mobile device to cause the mobile device to:
  execute an adaptive application, wherein the adaptive application is associated with a single launch icon that is displayed on a main launch screen of the mobile device, and wherein the single launch icon automatically changes appearance based on changing merchant-specific application settings that are applied to the adaptive application in response to different triggering factors; and
  instantiate a user interface for the adaptive application, the user interface comprising the following:
    a dynamically changeable skin that is updatable to include merchant-specific elements associated with a merchant, wherein the dynamically changeable skin changes based on a location of the mobile device;
    one or more dynamically changeable user interaction elements that allow a user of the mobile device to interact with the adaptive application represented by the user interface, wherein the dynamically changeable user interaction elements change based on the location of the mobile device and based on a determination that at least one biometric trigger has been received, the biometric trigger comprising at least one of a fingerprint scan, a facial scan, or a voice print, and wherein one or more different merchant-specific settings are automatically and dynamically applied upon the mobile device changing locations so as to enter a second, different merchant location, such that one or more portions of functionality provided by the adaptive application are dynamically changed according to the one or more different merchant-specific settings for the second, different merchant location, and wherein the single launch icon also automatically changes in appearance upon application of the one or more different merchant-specific application settings; and an application data portion that presents application data.

18. The one or more computer-readable hardware storage devices of claim 17, wherein the dynamically changeable skin presents a look and feel of the merchant on the adaptive application.

19. The one or more computer-readable hardware storage devices of claim 17, wherein the dynamically changeable user interaction elements present coupons or offers to the user and, upon selection by the user, apply the coupons or offers to a payment between the user and the merchant.

\* \* \* \* \*